Feb. 27, 1962 R. W. REPSHER 3,023,340
PHOSPHOR, LAMP AND METHOD
Filed Oct. 29, 1959

INVENTOR.
ROBERT W. REPSHER.
BY
W. D. Palmer
ATTORNEY.

United States Patent Office 3,023,340
Patented Feb. 27, 1962

3,023,340
PHOSPHOR, LAMP AND METHOD
Robert W. Repsher, Kinnelon, N.J., assignor to Westinghouse Electric Corporation, East Pittsburgh, Pa., a corporation of Pennsylvania
Filed Oct. 29, 1959, Ser. No. 849,474
10 Claims. (Cl. 313—109)

This invention relates to phosphors, fluorescent lamps and methods for producing improved halophosphate phosphors for fluorescent lamps and, more particularly, to an improved halophosphate phosphor, a fluorescent lamp which incorporates such improved halophosphate phosphor and methods for processing halophosphate phosphors in order to improve their output.

Halophosphate phosphor materials for fluorescent lamps are well known and are described in U.S. Patent No. 2,488,733, dated November 22, 1949. These phosphors are generally analogous to the natural mineral apatite and will display substantially the same X-ray diffraction pattern as this mineral. Such phosphors may be represented by the matrix $3M_3(PO_4)_2 \cdot 1M'L_2$, where L represents a halogen or mixture of halogens and M and M' represent either different or identical bivalent metals or mixtures of such metals. In practice, the primary constituent for most halophosphate phosphor is calcium orthophosphate although strontium orthophosphate is used in some limited cases. The halide constituent normally comprises calcium chloride or fluoride or strontium chloride or fluoride or mixtures of both and the activator materials are normally antimony or antimony plus manganese. The great majority of fluorescent lamps which are presently manufactured in this country incorporate such a phosphor and the term "halophosphate" has become generic to the art for a phosphor of the foregoing general formulation and structure.

In preparing a halophosphate phosphor, the phosphor raw-mix constituents are thoroughly mixed and are fired under predetermined conditions. The first-fired phosphor is desirably reduced to finely-divided status and then refired, in order to improve its output. Thereafter the phosphor is again reduced to finely-divided status, such as by crushing in a hammermill. The resulting finely-divided phosphor may then be washed with an acid or a base as disclosed in U.S. Patent No. 2,691,601, dated October 12, 1954, to remove damaged or weakly-luminescent particles and the washed phosphor is water rinsed to remove residual traces of acid or base. To facilitate drying, the rinsed and still damp phosphor is placed into trays and oven dried at somewhat elevated temperatures. Thereafter the phosphor is incorporated into a coating suspension or so-called "paint" which is used to coat the inner surface of the fluorescent lamp tube. In order to produce a desired coating texture for the paint, it has been necessary to mill the paint to break down overly-large phosphor particles and agglomerates, which would otherwise give the coated lamp a coarse or a grainy appearance. While such a milling does provide the coating suspension or paint with a texture suitable for coating, it has been found that additional phosphor particles having decreased output are produced by this paint milling. This of course reduces the total output of the resulting fluorescent lamp.

The fluorescent lamp art is highly competitive and a lamp which has an output of 1 or 2 lumens per watt greater than a competitive lamp will normally be sold over an otherwise-similar competitive lamp. Thus any improvement which will result in any appreciable increase in output and efficiency has a great effect in promoting one lamp over another competitive lamp.

It is the general object of this invention to provide a method for improving the luminosity output of halophosphate phosphors for use in fluorescent lamps.

It is a further object to provide an improved halophosphate phosphor for use in fluorescent lamps, which phosphor has been processed by an improved method.

It is another object to provide a fluorescent lamp which incorporates a halophosphate phosphor which has been processed by an improved method to improve its output.

It is still another object to provide method details for improving the luminosity output characteristics for halophosphate phosphors.

The aforesaid objects of the invention, and other objects which will become apparent as the description proceeds, are achieved by providing an improved method for processing halophosphate phosphor after formation by firing and before lamp envelope coating, in order to improve the output of the fluorescent lamp incorporating such phosphor. Briefly, the method comprises finely dividing the phosphor after firing so that substantially all resulting phosphor particles have a diameter less than 20 microns. Thereafter the finely-divided phosphor is mixed with an aqueous acidic or basic solution. Substantially all residual acid or base is then removed from the phosphor and it is washed with an alcohol having a boiling point not greater than 98° C. Substantially all residual remaining alcohol is volatilized from the alcohol-washed phosphor and the dried phosphor is stirred with a volatile vehicle and small amount of vehicle-soluble binder to form a phosphor-vehicle suspension suitable for coating a fluorescent lamp envelope. By this method, all milling of the phosphor which might damage or alter the phosphor particles is accomplished before the phosphor is washed with the acidic or basic solution and the phosphor can be incorporated into a coating suspension by means of a simple stirring, rather than a damaging milling. There is also provided the resulting improved phosphor and the lamp incorporating such improved phosphor.

For a better understanding of the invention, reference should be had to the accompanying drawings wherein.

Figure 1:
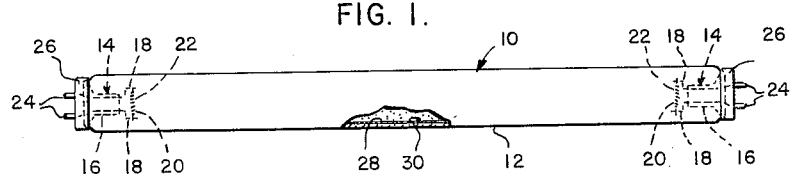
FIG. 1 is an elevational view, partly in section, of a fluorescent lamp embodying the improved halophosphate phosphor material of this invention.

With specific reference to the form of the invention illustrated in the drawing, the numeral 10 in FIG. 1 illustrates generally a 40 w. T12 type fluorescent lamp comprising a tubular, light-transmitting vitreous envelope 12 which is fabricated of the usual soda-lime-silica glass for example. Mounts 14 are sealed into either end of the envelope 12 as is customary. Each mount comprises a vitreous portion 16 sealed to the end of the envelope 12 with lead conductors 18 sealed therethrough and supporting at their inwardly-extending extremities refractory metal coils 20, which are fabricated of tungsten for example. These coils are of conventional coiled-coil construction or of a triple-coil construction and contained within the turns of the inner coil or coils is a filling of electron-emitting material 22. Such electron-emitting materials are well known and normally comprise a mixture of alkaline-earth oxides which may have other materials such as zirconia added thereto. As a specific example, the electron-emitting material comprises a mixture of 60% by weight barium oxide, 30% by weight calcium oxide and 10% by weight strontium oxide.

Electrical connection for the lead conductors 18 is normally effected by contact pins 24 which project from supporting base caps 26 at either end of the lamp 10. The envelope 12 has coated on its inner surface a phospher material 28, which in accordance with this invention comprises halophosphate phosphor material which has been processed by the present method. The envelope also contains a small filling of argon or other inert, ionizable gas, at a pressure of about 4 mm. for example, in order to facilitate starting, and other starting gas fill pressures can be used, as is well known. Also contained within the envelope 12 is the usual small charge of mercury 30. In the operation of such a lamp, the phosphor 28 responds to the 2537 A.U. resonant radiation of the mercury discharge to produce longer wavelength radiations.

The halophosphate phosphor material is first processed conventionally by mixing together the raw-mix constituents and firing same in accordance with a predetermined schedule. Following are specific examples.

Example I

Raw-mix constituent: Grams
- CaO _____ 583
- $P_2O_5$ _____ 538
- Mn (added as manganous carbonate) _____ 10.17
- $Sb_2O_3$ _____ 31.0
- $SrCl_2$ _____ 48.0
- $CaF_2$ _____ 77.3

NOTE.—In the foregoing example, the metal to phosphorus molar ratio can be varied from 4.65 to 4.92 to 3. The halide to phosphorus ratio can be varied from 1.02/6 to 1.23/6. The chlorine to fluorine ratio can be varied from 1 mole chlorine to 6 moles fluorine to 1:1. The antimony can be varied from about 1% to about 4% by weight of the phosphor and the manganese can be varied from about 0.7% to about 0.9% by weight of the phosphor.

The foregoing raw mix constituents are thoroughly mixed or blended by means of a pebble mill, for example. These raw-mix constituents are then fired in a covered crucible at a temperature of about 1185° C. for a period of three hours, although the firing temperatures may vary from 1140° C. to 1195° C., for example, the higher the firing temperature, the shorter the firing time. Also, the firing time will vary with the batch size and depth of material in the crucible. After the first firing, the phosphor material is desirably milled and then refired at a temperature of from 1100° C. to 1130° C., for example, the higher the firing temperature the shorter the firing time. The preferred refiring temperature is about 1120° C. for about 2½ hours. This phosphor is a 4500° K. halophosphate having I.C.I. color coordinates of about $x=0.361$ and $y=0.370$.

Example II

Raw-mix constituent: Grams
- CaO _____ 63.6
- $P_2O_5$ _____ 54.4
- $Sb_2O_3$ _____ 1.48
- $CaF_2$ _____ 8.92

The foregoing phosphor raw-mix constituents are mixed and fired in a covered crucible at a temperature of about 1180° C., for example, and thereafter desirably milled and refired at a temperature of about 1130° C. for about 2½ hours. The resulting phosphor is a blue halophosphate having I.C.I. color coordinates of about $x=0.215$ and $y=0.268$.

Example III

Raw-mix constituent: Grams
- CaO _____ 569
- $P_2O_5$ _____ 538
- Mn (as manganous carbonate) _____ 21.50
- $Sb_2O_3$ _____ 31.0
- $SrCl_2$ _____ 48.0
- $CaF_2$ _____ 77.3

The foregoing materials are mixed and fired in a covered crucible at a temperature of about 1140° C. for about 3 hours and thereafter desirably milled and refired at a temperature of about 1090° C. for about 2½ hours. The resulting phosphor is a warm-white halophosphate having color coordinates of about $x=0.436$ and $y=0.404$.

Example IV

Raw-mix constituent: Grams
- CaO _____ 569
- $P_2O_5$ _____ 538
- Mn (as manganous carbonate) _____ 16.25
- $Sb_2O_3$ _____ 31.0
- $SrCl_2$ _____ 48.0
- $CaF_2$ _____ 77.3

The foregoing raw-mix constituents are mixed and fired at 1130° C. for about 3 hours and thereafter desirably milled and refired at about 1120° C. for about 2 hours. This produces a 3500° K. halophosphate.

The four specific examples given hereinbefore describe a wide range of halophosphate phosphor materials and any of these examples can be processed in accordance with the present method to improve the output of the fluorescent lamp incorporating such phosphor. It should be understood that the present method is applicable to any halophosphate phosphor material and any of the specific examples as given in U.S. Patent No. 2,488,733, dated November 22, 1949, can be similarly processed to achieve similar beneficial results.

Figure 2:
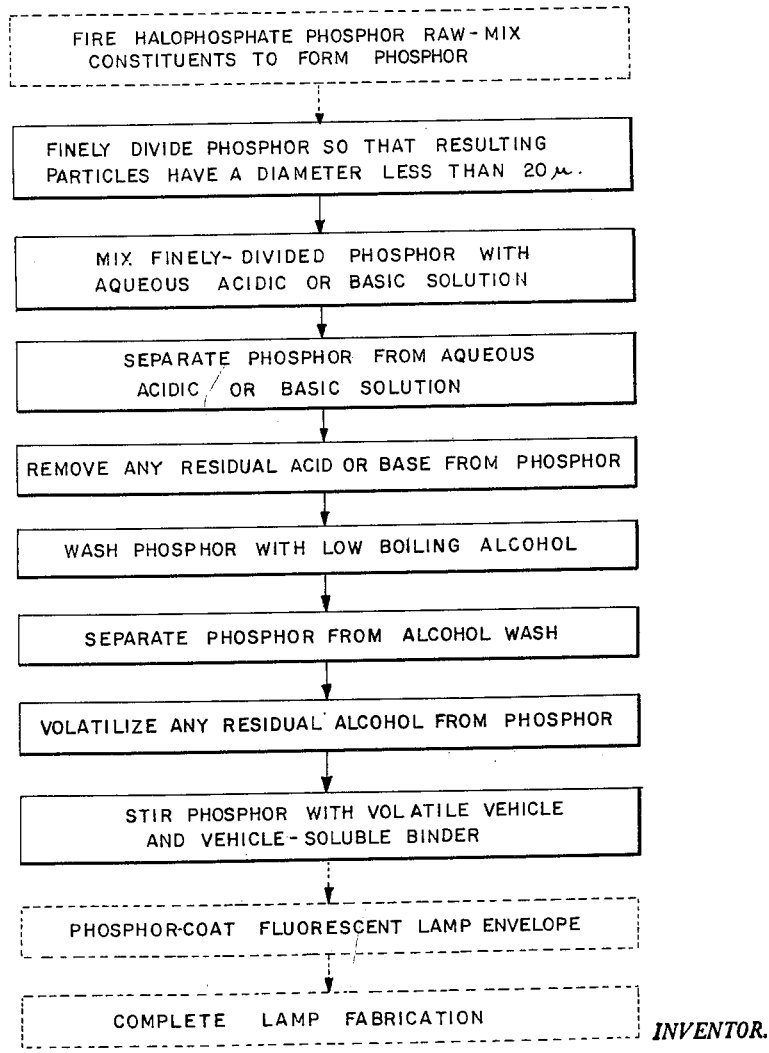
FIG. 2 is a flow chart illustrating the method steps used in processing halophosphate phosphor in accordance with the present invention.

Before processing in accordance with the present invention, the halophosphate phosphor is first initially processed by firing as indicated hereinbefore. By way of example, the 4500° K. halophosphate specified under Example I will be considered. As per the flow chart shown in FIG. 2, the phosphor is crushed to finely-divided status after formation by firing so that substantially all particles have a diameter less than a predetermined value, in order that the phosphor when coated will not have a grainy or coarse appearance which might impair commercial acceptance of the completed lamp. For present commercial standards, it has been found that the state of division for the finely-divided phosphor should be such that substantially all particles have a diameter less than 20 microns. The term "particles" as used herein is meant to include phosphor particle agglomerates as well as individual phosphor particles. A reduction to the indicated particle size is readily achieved by first hammermilling the phosphor and then milling same for a prolonged period. As a specific example, 400 grams of the phosphor are mixed with 200 cc. of water and milled for a period of two hours in a one quart capacity pebblemill, using ¾ inch flint pebbles. The finely-divided phosphor is removed from the pebblemill and is placed into a stainless steel container with 1300 cc. of 0.1 normal aqueous nitric acid solution. The phosphor-acid mixture is agitated for a period of approximately two hours, after which the phosphor is separated from the aqueous acidic solution by filtration. The phosphor is then water rinsed to remove substantially all residual acid. Water rinsing is conveniently accomplished by rinsing the phosphor with one liter of water, repeating the rinsing operation three times. The still damp phosphor is then washed with a solution which principally comprises an alcohol having a boiling point not greater than 98° C. Such alcohols include methyl, ethyl, isopropyl and normal-propyl. If higher-boiling alcohols are utilized, adequate drying of the phosphor after the alcohol wash is difficult and the beneficial effects of the alcohol wash are minimized. As an example, the phosphor is mixed with one liter of commercial isopropyl alcohol and the mixture agitated for a period of ten minutes. Thereafter the phosphor is separated from the alcohol washing solution by filtration. The separated phosphor is dried, preferably at an elevated temperature such as approximately 100° C. to volatilize substantially all residual alcohol therefrom. The dried phosphor is then stirred together with a volatile vehicle and a small amount of vehicle-soluble binder to form a phosphor-vehicle suspension or so-called paint which is suitable for coating a fluorescent lamp. As a specific example 400 grams of the phosphor are mixed with 540 cc. of xylol and 110 cc. of butanol, together with 14 grams of ethyl cellulose having a viscosity of 300 cps. The mixture is stirred with any conventional power-driven stirring mechanism for a period of approximately one-half hour. This forms a homogeneous suspension or paint of the very finely-divided phosphor material. This paint may be further thinned if desired. The prepared paint is flushed over the inside of a fluorescent tube, after which the ethyl cellulose binder is volatilized by lehring the coated tube at a temperature of about 650° C. for about three minutes for example. Thereafter lamp fabrication is completed in accordance with conventional practices.

The foregoing phosphor processing is subjected to considerable variation. By way of example, the initial crushing of the phosphor to reduce it to a finely-divided status can be accomplished in reducing mechanisms other than a pebblemill and alternatively, phosphor particles having a diameter of twenty microns and greater can be fractionated from the remaining phosphor by means of an air-separation or water-settling technique. The actual state of division of the milled phosphor is not critical provided that substantially all larger phosphor particles have a diameter less than 20 microns. For the specific example given hereinbefore, the average particle diameter of the initially-milled phosphor is about 10 microns. If a more-extended initial milling is utilized, more smaller and damaged phosphor particles will be produced and subsequentially removed by the later acidic washing solution. Conversely, if less initial milling is utilized, fewer smaller and damaged phosphor particles will be produced. Nitric acid is preferred for washing the phosphor although other acids and mineral acids such as hydrochloric and sulphuric acid can be substituted therefor. The normality of the aqueous acid solution is subject to a wide latitude. In the case of the preferred nitric acid, normalities of from 0.01 to 0.3 can be used and even this wide range is not critical. The relative proportions of the preferred acidic washing solution and phosphor are subject to wide variation as is the time which the acidic solution and phosphor are mixed. Phosphor acid washing and milling to achieve a predetermined particle size can be consolidated into one step by wet milling the fired phosphor with an acidic solution. Preferably the acid washing follows the phosphor milling. Phosphor rinsing to remove residual traces of acid is also subject to variation and more or fewer rinses can be used if desired. In the alcohol washing step for the rinsed phosphor, it is preferred to use isopropyl alcohol although the other indicated alcohols can be substituted therefor. For reasons of economy, commercial grades of these alcohols are preferred and these will normally contain some water and other impurities. If ethyl alcohol is used, the denatured form of this alcohol is satisfactory. The relative proportions of the alcohol washing solution and phosphor are also subject to wide variation as is the time which the alcohol washing solution and phosphor are mixed. The drying temperature for the phosphor is subject to wide variation and the alcohol can be volatilized from the phosphor either at room temperature or at highly-elevated temperatures. While ethyl cellulose binder and xylol-butanol vehicle have been given in the preferred example, a vehicle and vehicle-binder of butyl acetate and nitrocellulose or water and methyl cellulose or other organic binder can be substituted for the xylol-butanol vehicle and ethyl cellulose binder. Reference is made to copending application S.N. 606,888, filed August 29, 1956, and owned by the present assignee, now Patent No. 2,976,249, for details with respect to a butyl acetate vehicle and nitrocellulose binder suitable for coating the phosphor. The relative proportions of phosphor and paint vehicles are also subject to variations. Inorganic binders such as boric acid can be substituted for the indicated organic binders. While any conventional stirring device can be used to suspend the phosphor in the vehicle-binder solution, a rotary shear homogenizer stirring device will shorten the time required to suspend the phosphor.

In practicing the present method, the aqueous acidic washing solution is preferred and the detailed description includes this preferred embodiment. If desired, the aqueous acidic solution used to wash the finely-divided phosphor after milling can be replaced by a basic washing solution. Examples are an aqueous solution of ammonium or sodium hydroxide having a hydroxyl concentration equivalent to the hydrogen ion concentration of the preferred acid washing solution. Except for the substitution of the base for the acid, the other steps in the method remain the same.

In practicing the present process, it is necessary to use the alcohol wash in order to enable the phosphor to be suspended in the vehicle-binder solution by means of a simple stirring. If the phosphor is first milled to the indicated particle size, thereafter mixed with the aqueous acidic or basic solution and then rinsed to remove substantially all residual traces of acid, with the alcohol washing step eliminated, the phosphor on drying will exhibit many agglomerated particles of considerable size. Such a phosphor requires considerable milling to form a paint which will provide the finished lamp with an acceptable coating texture. Thus in accordance with the present method, the objectionable milling previously used to suspend the phosphor is eliminated, which milling as noted hereinbefore decreases the luminosity of at least some of the phosphor particles. The function of the alcohol wash in preventing the formation of the phosphor agglomerations is not understood, but by way of possible explanation, very finely-divided phosphor particles which tend to cement or stick the larger particles together are removed by the alcohol wash. As another possible explanation, a small amount of phosphor in solution may act to cement larger phosphor particles together. If such phosphor in water solution is present, it is removed by the alcohol wash. Whatever the explanation, the alcohol washing step is required to enable the phosphor to be incorporated into the coating suspension by means of a simple stirring.

In control tests on a series of 40 w. T12 lamps coated with the indicated 4500° K. halophosphate, approximately 50 lumens were gained by processing the phosphor in accordance with the present method. In other words, milling of the phosphor to place it into suspension in forming the coating paint damages or otherwise deleteriously effects the phosphor particles to such extent that the luminosity of a lamp incorporating such milled phosphor is decreased to the extent of 50 lumens. Other halophosphate phosphor materials show an equivalent gain in luminosity through processing in accordance with the present method.

It will be recognized that the objects of the invention have been achieved by providing a method for improving the luminosity output of halophosphate phosphors for use in fluorescent lamps. There has also been provided an improved halophosphate phosphor for use in fluorescent lamps as well as a fluorescent lamp which incorporates such improved phosphor. Method details for improving such phosphor have also been provided.

As a possible alternative embodiment, the present improved halophosphate phosphors may be mixed or blended with other phosphor materials in order to achieve desired color effects in the coated lamps. The improved luminosity will still be present in proportion to the amount of the halophosphate phosphor which is used in the blend.

As a specific example, a "soft white" blend of phosphor is prepared by mixing the following:

Phosphor: Percent by weight
    4500° K. halo (Example I) _____ 20.8
    Blue halo (Example II) _____ 28
    Calcium silicate:0.03% Mn:0.0045% Pb____ 51.2

Many other blends which incorporate varying proportions of halophosphate phosphors can also be prepared, as is well known.

While best-known embodiments have been illustrated and described in detail, it is to be particularly understood that the invention is not limited thereto or thereby.

I claim:

1. The method of processing halophosphate phosphor after formation by firing and before lamp envelope coating to improve the output of the fluorescent lamp incorporating such phosphor, which method comprises, finely dividing fired halophosphate phosphor to such degree that substantially all resulting phosphor particles have a diameter less than 20 microns, mixing together the finely-divided phosphor and an aqueous acidic solution, separating the phosphor from the aqueous acidic solution, removing substantially all residual acid from the phosphor, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble binder to form a phosphor-vehicle suspension suitable for phosphor coating a fluorescent lamp envelope.

2. The method of processing halophosphate phosphor after formation by firing and before lamp envelope coating to improve the output of the fluorescent lamp incorporating such phosphor, which method comprises, finely dividing fired halophosphate phosphor to such degree that substantially all resulting phosphor particles have a diameter less than 20 microns, mixing together the finely-divided phosphor and an aqueous basic solution, separating the phosphor from the aqueous basic solution, removing substantially all residual base from the phosphor, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble binder to form a phosphor-vehicle suspension suitable for phosphor coating a fluorescent lamp envelope.

3. The method of processing halophosphate phosphor after formation by firing and before lamp envelope coating to improve the output of the fluorescent lamp incorporating such phosphor, which method comprises, finely dividing fired halophosphate phosphor to such degree that substantially all resulting phosphor particles have a diameter less than 20 microns, mixing together the finely-divided phosphor and an aqueous mineral acid solution, separating the phosphor from the aqueous acidic solution, water rinsing the phosphor to remove substantially all residual acid therefrom, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble organic binder to form a phosphor-vehicle suspension suitable for phosphor coating a fluorescent lamp envelope.

4. The method of processing halophosphate phosphor after formation by firing and before lamp envelope coating to improve the output of the fluorescent lamp incorporating such phosphor, which method comprises, finely dividing fired halophosphate phosphor to such degree that substantially all resulting phosphor particles have a diameter less than 20 microns, mixing together the finely-divided phosphor and an aqueous nitric acid solution, separating the phosphor from the aqueous acidic solution, water rinsing the phosphor to remove substantially all residual acid therefrom, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble binder to form a phosphor-vehicle suspension suitable for phosphor coating a fluorescent lamp envelope.

5. The method of processing halophosphate phosphor after formation by firing and before lamp envelope coating to improve the output of the fluorescent lamp incorporating such phosphor, which method comprises, milling fired halophosphate phosphor to such degree that substantially all resulting phosphor particles have a diameter less than 20 microns, mixing together the finely-divided phosphor and an aqueous nitric acid solution having a normality of about 0.1, separating the phosphor from the aqueous acidic solution, water rinsing the phosphor to remove substantially all residual acid therefrom, washing the phosphor with a solution principally comprising isopropyl alcohol, separating the phosphor from the alcohol washing solution, volatilizing substantially all residual alcohol from the phosphor, and thereafter stirring the phosphor together with a xylol-butanol vehicle and a small amount of ethyl cellulose binder to form a phosphor-vehicle suspension suitable for phosphor coating a fluorescent lamp envelope.

6. A halophosphate phosphor for use in fluorescent lamps, said phosphor having been processed after formation by firing and before lamp envelope coating by the method which comprises, finely dividing fired halophosphate phosphor to such degree that substantially all resulting phosphor particles have a diameter less than 20 microns, mixing together the finely-divided phosphor and an aqueous acidic solution, separating the phosphor from the aqueous acidic solution, removing substantially all residual acid from the phosphor, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble binder to form a phosphor-vehicle suspension suitable for phosphor coating a fluorescent lamp envelope.

7. A fluorescent lamp comprising a light-transmitting envelope having electrodes operatively disposed therein and containing an inert ionizable gas and a charge of mercury, a coating on the inner surface of said envelope comprising halophosphate phosphor, said halophosphate phosphor having been processed after formation by firing and before lamp envelope coating by the method comprising, finely dividing fired halophosphate phosphor to such degree that substantially all resulting phosphor particles have a diameter less than 20 microns, mixing together the finely-divided phosphor and an aqueous acidic solution, separating the phosphor from the aqueous acidic solution, removing substantially all residual acid from the phosphor, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble binder to form a phosphor-vehicle suspension suitable for phosphor coating a fluorescent lamp envelope.

8. The method of processing halophosphate phosphor after formation by firing and before lamp envelope coating to improve the output of the fluorescent lamp incorporating such phosphor, which method comprises, finely dividing fired halophosphate, phosphor to such degree that substantially all resulting phosphor particles have a diameter less than a predetermined value, mixing together the finely-divided phosphor and a solution of the group consisting of an aqueous acid washing solution and an aqueous basic washing solution, separating the phosphor from said solution, removing substantially all residual amounts of said solution from the phosphor, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble binder to form a phosphor-vehicle suspension suitable for phosphor coating a fluorescent lamp envelope.

9. The method of processing halophosphate phosphor after formation by firing and before lamp envelope coating to improve the output of the fluorescent lamp incorporating such phosphor, which method comprises, milling fired halophosphate phosphor and a solution of the group consisting of an aqueous acid solution and an aqueous basic solution a sufficient amount to finely divide the phosphor so that substantially all particles have a diameter less than a predetermined value, separating the phosphor from said solution, removing substantially all residual amounts of said solution from the phosphor, washing the phosphor with a solution principally comprising an alcohol having a boiling point not greater than 98° C., separating the phosphor from the alcohol washing solution, volatilizing substantially all residual alcohol from the phosphor, and thereafter stirring the phosphor together with a volatile vehicle and a small amount of vehicle-soluble binder to form a phosphor-vehicle suspension suitable for phosphor coating a fluorescent lamp envelope.

10. The method of processing halophosphate phosphor after formation by firing, which method comprises, finely dividing prepared halophosphate phosphor to such degree that substantially all resulting phosphor particles have a diameter less than a predetermined value, mixing together the finely divided phosphor and one solution of the group consisting of an aqueous acid washing solution and an aqueous basic washing solution, separating the phosphor from said washing solution, removing substantially all residual amounts of said washing solution from said phosphor, washing the phosphor with a solution principally comprising an alcohol having a boiling point not greater than 98° C., separating the phosphor from the alcohol washing solution, and volatilizing substantially all residual alcohol from the phosphor.

References Cited in the file of this patent

UNITED STATES PATENTS

| | | |
|---|---|---|
| 2,755,254 | Butler | July 17, 1954 |
| 2,772,241 | Ramby | Nov. 27, 1956 |
| 2,806,970 | Meister et al. | Sept. 17, 1957 |
| 2,814,748 | Cox | Nov. 26, 1957 |
| 2,838,707 | Schwing et al. | June 10, 1958 |